(12) United States Patent
Feng et al.

(10) Patent No.: US 8,130,604 B2
(45) Date of Patent: Mar. 6, 2012

(54) SPHERICAL ABERRATION COMPENSATION METHOD AND DEVICE OF OPTICAL DISC DRIVE

(75) Inventors: Wen-Chun Feng, Hsinchu (TW); Zhi-Hsin Lin, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 0 days.

(21) Appl. No.: 12/955,304

(22) Filed: Nov. 29, 2010

(65) Prior Publication Data
US 2012/0014238 A1  Jan. 19, 2012

(30) Foreign Application Priority Data
Jul. 13, 2010  (TW) .............................. 99122974 A

(51) Int. Cl.
*G11B 7/00*  (2006.01)
(52) U.S. Cl. .................................... 369/44.32; 369/53.2
(58) Field of Classification Search ............... 369/44.32, 369/44.29, 44.35, 94, 53.19, 53.2, 44.26, 369/44.25, 44.28, 112.23
See application file for complete search history.

(56) References Cited

U.S. PATENT DOCUMENTS

| | | | |
|---|---|---|---|
| 2004/0027938 A1* | 2/2004 | Sasaki et al. | 369/44.32 |
| 2005/0141363 A1* | 6/2005 | Shimamoto et al. | 369/44.29 |
| 2006/0291339 A1* | 12/2006 | Mijirtiskii | 369/30.24 |
| 2007/0274166 A1* | 11/2007 | Imagawa | 369/43 |
| 2009/0135685 A1* | 5/2009 | Murao et al. | 369/44.32 |
| 2009/0168616 A1 | 7/2009 | Chung et al. | |
| 2010/0232266 A1* | 9/2010 | Tamaki | 369/44.32 |

FOREIGN PATENT DOCUMENTS

TW  200929197  7/2009

* cited by examiner

*Primary Examiner* — Thang Tran
(74) *Attorney, Agent, or Firm* — WPAT, PC; Justin King

(57) ABSTRACT

A spherical aberration compensation method is provided. A first thickness of a cover layer at a first radius position of an optical disc is measured. A second thickness of the cover layer at a second radius position of the optical disc is measured. A spherical aberration calibration is performed at a third radius position of the optical disc to obtain an optimal spherical aberration compensation value. According to the first and second radius positions, the first and second thicknesses, and the optimal spherical aberration compensation value at the third radius position, a spherical aberration compensation formula is acquired. Afterwards, an updated spherical aberration compensation value is calculated by the spherical aberration compensation formula according to a fourth radius position where an optical pickup head of the optical disc drive is located. The updated spherical aberration compensation value is inputted into a spherical aberration compensator of the optical disc drive.

10 Claims, 9 Drawing Sheets

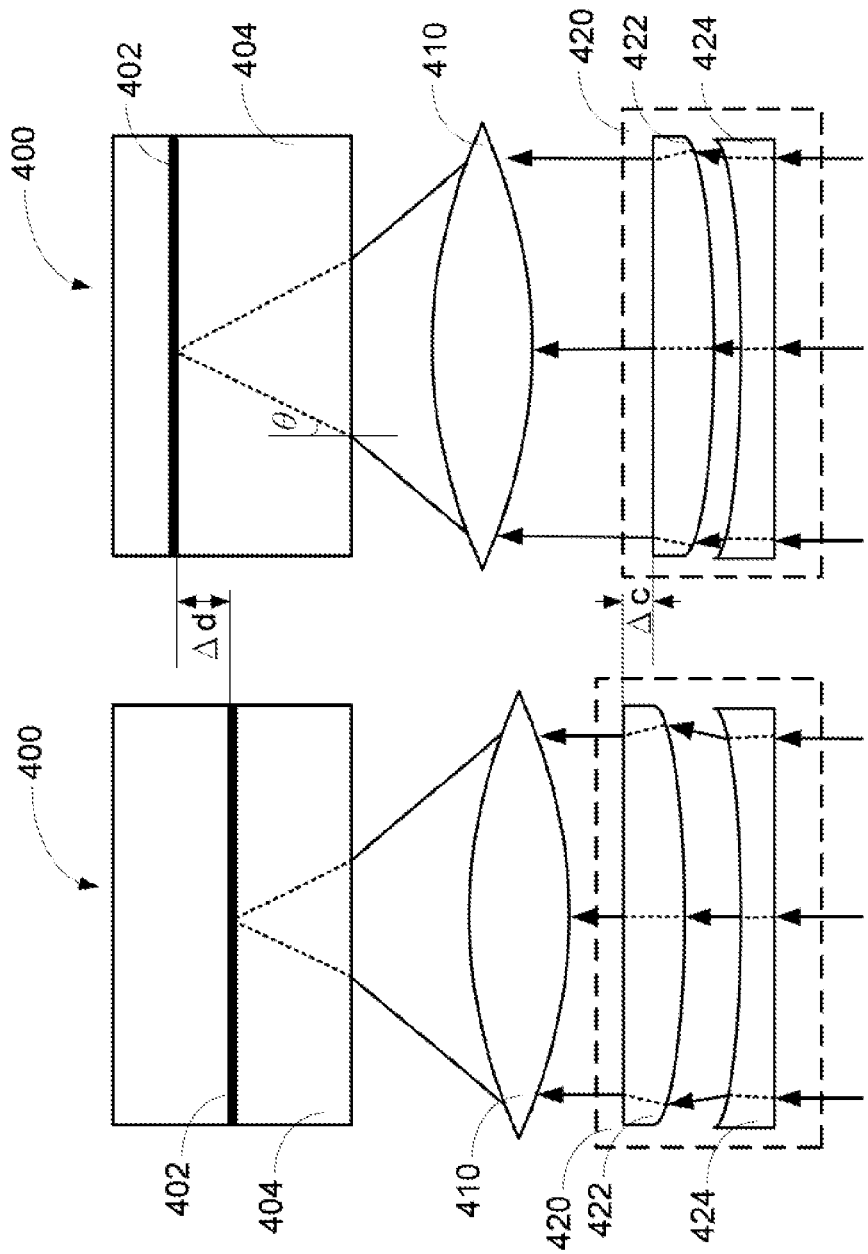

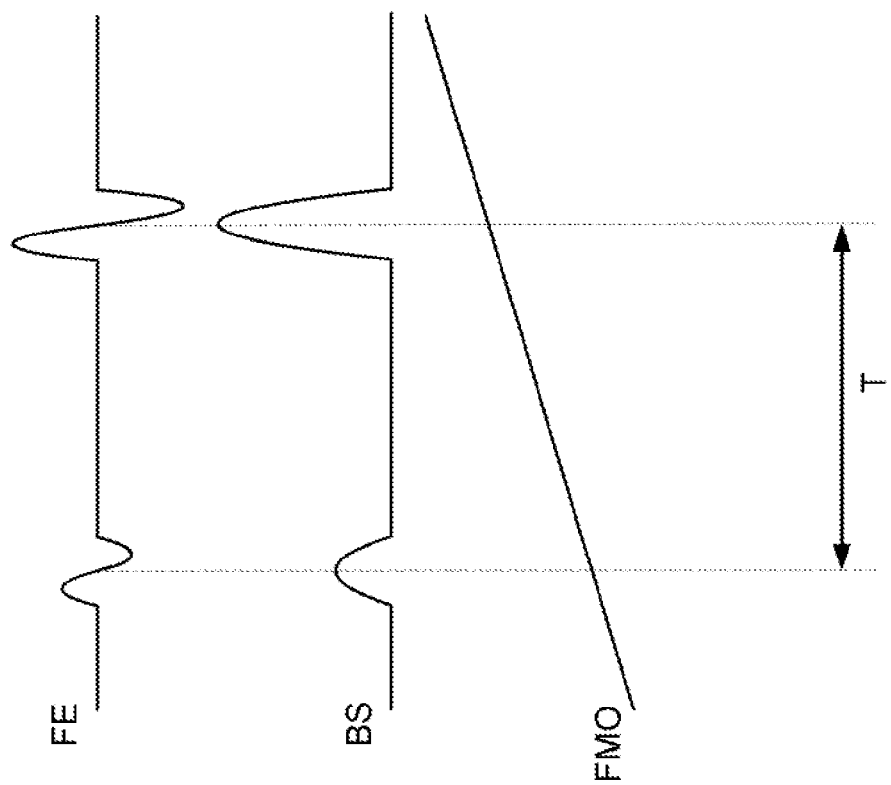

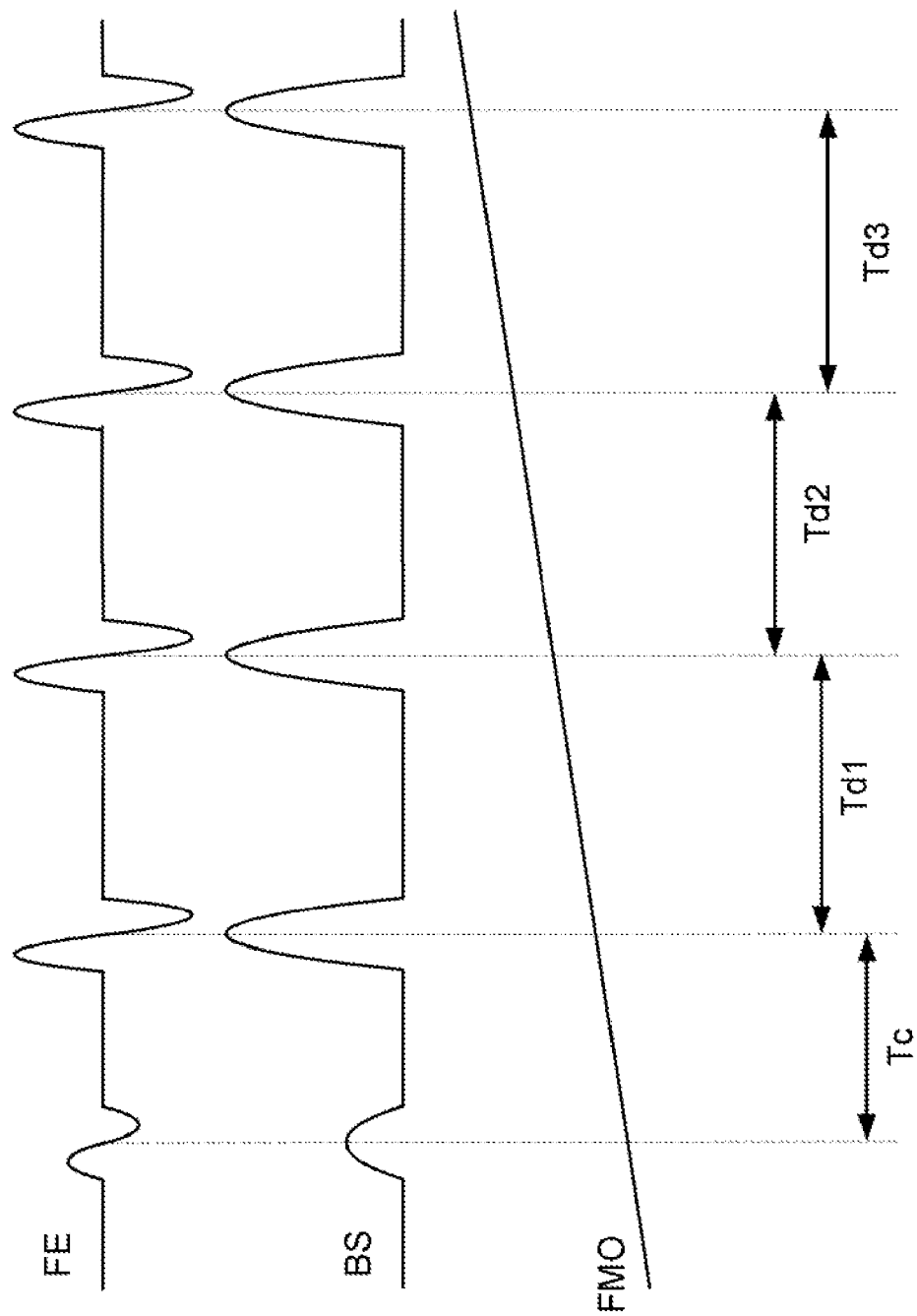

SPHERICAL ABERRATION COMPENSATION METHOD AND DEVICE OF OPTICAL DISC DRIVE

This application claims the benefit of Taiwan application Serial No. 99122974, filed Jul. 13, 2010, the subject matter of which is incorporated herein by reference.

BACKGROUND

1. Technical Field

The present invention relates to a controlling method and a controlling device of an optical disc drive, and more particularly to a spherical aberration compensation method and a spherical aberration compensation device of an optical disc drive.

2. Description of the Related Art

FIG. 1 is a schematic diagram illustrating a spherical aberration effect observed in a lens. In a case that the spherical aberration occurs, the light beams passing through the paraxial zone A1 of the lens 120 are focused on the point A on a plane 100, but the light beams passing through the axial zone B1 of the lens 120 are focused on the point B in front of the plane 100. That is, since the focus points of the light beams passing through the axial zone and the paraxial zone are not superimposed with each other, the spherical aberration occurs. The spherical aberration is usually abbreviated as "SA".

Generally, the thickness deviation of a cover layer (also referred as a transparent plastic layer) is a principal reason that causes the spherical aberration. Once the spherical aberration occurs, the quality of the playback signal such as a radio frequency signal (RF) or a servo signal (e.g. a focusing error signal (FE) or a tracking error signal (TE)) will be deteriorated to adversely affect the performance of reproducing the optical disc.

For reducing the spherical aberration, a spherical aberration compensator is usually installed in an optical disc drive. In addition, a spherical aberration calibration (SA calibration) is added to a start-up procedure of the optical disc drive. In such way, after a spherical aberration compensation value is received by the spherical aberration compensator, the influence of the spherical aberration will be decreased. That is, the focuses of the light beams passing through the axial zone and the paraxial zone will be substantially at the same position. After the start-up procedure of the optical disc drive is implemented, normal data access of the optical disc will be started.

Generally, the common spherical aberration compensators are classified into two types, i.e. an LCD-type spherical aberration compensator and a collimating-type spherical aberration compensator. When a spherical aberration compensation value is received by the LCD-type spherical aberration compensator, the refractive index thereof is changed to reduce the optical path difference between the paraxial zone and the axial zone is reduced. As such, the influence of the spherical aberration is decreased. On the other hand, when a spherical aberration compensation value is received by the collimating-type spherical aberration compensator, a relative position of an optical element thereof is adjusted to reduce the optical path difference between the paraxial zone and the axial zone is reduced. As such, the influence of the spherical aberration is decreased.

As known, for performing the start-up procedure, the optical pickup head of the optical disc drive is controlled to move to an inner track position of the optical disc. In other words, the SA calibration is performed at the cover surface of the optical disc near the inner track position. The spherical aberration compensation value acquired from the SA calibration is only effective to reduce the spherical aberration at the inner track region. If the thickness of the cover layer of the optical disc is uniform, the spherical aberration compensation value is effective to reduce the spherical aberration all over the optical disc.

The thickness of the cover layer of the optical disc, however, might be non-uniform from the inner track to the outer track due to process variation. Under this circumstance, when a SA calibration is performed at the inner track region to acquire the spherical aberration compensation value (also referred as a SA value), the spherical aberration compensation value is not effective to reduce the spherical aberration at other region (e.g. an outer track region) of the optical disc. As such, the playback signal read from the outer track region of the optical disc has deteriorated quality. The situation is worse when the optical pickup head fails to successfully focus on the outer track region of the optical disc or the playback signal fails to be generated.

FIGS. 2A and 2B are schematic diagrams illustrating two kinds of optical discs with non-uniform cover layer thickness. As shown in FIG. 2A, the optical disc 200 has a central hole 205 in the middle thereof. The thickness of the cover layer 220 of the optical disc 200 is non-uniform. From the surface of the cover layer 220 to the data layer 210 of the optical disc 200, the inner track region is relatively thinner but the outer track region is relatively thicker. As shown in FIG. 2B, the optical disc 250 has a central hole 255 in the middle thereof. The thickness of the cover layer 270 of the optical disc 250 is also non-uniform. From the surface of the cover layer 270 to the data layer 260 of the optical disc 250, the inner track region is relatively thicker but the outer track region is relatively thinner.

For compensating the spherical aberration resulting from the non-uniform thickness of the cover layer of the optical disc, a spherical aberration compensation method is disclosed in for example Taiwanese Patent Publication No. 200929197 (corresponding to US Patent Publication No. 20090168616), which is entitled "Spherical aberration compensation method of optical storage device".

FIG. 3 is a flowchart illustrating a spherical aberration compensation method disclosed in US Patent Publication No. 20090168616. After the optical disc drive is activated (Step 300), the optical pickup head is moved to a first track position (Step 302), and a spherical aberration calibration is performed at the first track position to acquire a first reference value (Step 304). Then, the optical pickup head is moved to a second track position (Step 306), and a spherical aberration calibration is performed at the second track position to acquire a second reference value (Step 308). Then, normal data access of the optical disc is started (Step 310). According to the first and second reference values, an interpolation is performed to acquire an interpolated spherical aberration compensation value (Step 312).

Then, check whether the interpolated spherical aberration compensation value is different from a current spherical aberration compensation value (Step 314). If these two values are different from each other, the interpolated spherical aberration compensation value is utilized to update the current spherical aberration compensation value (Step 316), and then go to Step 312. Otherwise, if these two values are identical, go to Step 312, and the current spherical aberration compensation value is not updated.

That is, according to the conventional spherical aberration compensation method, a first spherical aberration compensation value (i.e. a first reference value) is acquired by performing a spherical aberration compensating correction (i.e.

spherical aberration calibration) at the inner track region of the optical disc, and then a second spherical aberration compensation value (i.e. a second reference value) is acquired by performing a spherical aberration compensating correction (i.e. spherical aberration calibration) at the outer track region of the optical disc. According to the first and second reference values, an interpolation is performed to obtain an interpolated spherical aberration compensation value at any radius position of the optical disc. When the optical pickup head is at any position of the optical disc, the interpolated spherical aberration compensation value is inputted into the spherical aberration compensator to reduce the influence of the spherical aberration.

As known, the process of performing the spherical aberration calibration is time-consuming. Since the conventional spherical aberration compensation method needs two spherical aberration calibration steps, it takes more time to perform the start-up procedure. In other words, the timing of accessing the data of the optical disc is delayed.

Moreover, in a case that the optical disc has two data layers, a first spherical aberration calibration and a second spherical aberration calibration are respectively performed on the first and second data layers of the optical disc at the inner track region to acquire first and second spherical aberration compensation values corresponding to the first and second data layers of the optical disc at the inner track region. Then, a third spherical aberration calibration and a fourth spherical aberration calibration are respectively performed on the third and fourth data layers of the optical disc at the outer track region to acquire third and fourth spherical aberration compensation values corresponding to the first and second data layers of the optical disc at the outer track region. According to the first, second, third and fourth spherical aberration compensation values, a first interpolated spherical aberration compensation value corresponding to the first data layer and a second interpolated spherical aberration compensation value corresponding to the second data layer are obtained.

Since the conventional spherical aberration compensation method of the optical disc having two data layers needs four spherical aberration calibration steps, it takes more time to perform the start-up procedure. In other words, the timing of accessing the data of the optical disc is largely delayed.

BRIEF SUMMARY

The present invention provides a spherical aberration compensation method and a spherical aberration compensation device of an optical disc drive. By performing a single spherical aberration calibration at a specified radius position of an optical disc and analyzing the thickness deviation of the cover layer of the optical disc, the spherical aberration compensation value at any radius position of the optical disc can be acquired.

In accordance with an aspect, the present invention provides a spherical aberration compensation method of an optical disc drive. Firstly, a first thickness of a cover layer at a first radius position of an optical disc is measured. Then, a second thickness of the cover layer at a second radius position of the optical disc is measured. Then, a spherical aberration calibration is performed at a third radius position of the optical disc to obtain an optimal spherical aberration compensation value. According to the first radius position, the second radius position, the first thickness, the second thickness and the optimal spherical aberration compensation value at the third radius position, a spherical aberration compensation formula is acquired. Afterwards, an updated spherical aberration compensation value is calculated by the spherical aberration compensation formula according to a fourth radius position where an optical pickup head of the optical disc drive is located. The updated spherical aberration compensation value is inputted into a spherical aberration compensator of the optical disc drive.

In accordance with another aspect, the present invention provides a spherical aberration compensation method of an optical disc drive. Firstly, a first thickness of a cover layer at a first radius position of an optical disc is measured. Then, a second thickness of the cover layer at a second radius position of the optical disc is measured. Then, a thickness distribution of the cover layer of the optical disc is analyzed according to the first radius position, the second radius position, the first thickness and the second thickness, thereby judging a change tendency of a spherical aberration compensation value. The, data of the optical disc are read, and an updated spherical aberration compensation value is acquired according to an error rate of reading the data and the change tendency of the spherical aberration compensation value. Afterwards, the updated spherical aberration compensation value is inputted into a spherical aberration compensator of the optical disc drive.

In accordance with a further aspect, the present invention provides a spherical aberration compensation device of an optical disc drive. The spherical aberration compensation device is connected with an optical pickup head. The spherical aberration compensation device includes a tracking actuator, a spherical aberration compensator, a focusing actuator, a light-detecting signal generator and a digital signal processor. The tracking actuator is connected with the optical pickup head for controlling the optical pickup head to move in a radial direction. The focusing actuator is connected with the optical pickup head for controlling the optical pickup head to move in a focusing direction. The light-detecting signal generator is used for receiving photo signals generated from the optical pickup head, and processing the photo signals into various electric signals. The digital signal processor is electrically connected with the tracking actuator, the spherical aberration compensator, the focusing actuator and the light-detecting signal generator. Under control of the digital signal processor, a first thickness of a cover layer of an optical disc is measured by moving the optical pickup head to a first radius position of the optical disc, a second thickness of the cover layer is measured by moving the optical pickup head to a second radius position of the optical disc, and a spherical aberration calibration is performed at a third radius position of the optical disc to obtain an optimal spherical aberration compensation value. In addition, under control of the digital signal processor, a spherical aberration compensation formula is acquired according to the first, second and third radius positions and the first and second thicknesses, an updated spherical aberration compensation value is calculated by the spherical aberration compensation formula according to a fourth radius position where an optical pickup head of the optical disc drive is located, and the updated spherical aberration compensation value is inputted into the spherical aberration compensator.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which:

FIGS. 4A and 4B are schematic diagrams illustrating the operations of a collimating-type spherical aberration compensator in response to a thickness change of a cover layer of an optical disc according to the present invention;

FIG. 6A is a schematic diagram illustrating associated signals during the thickness of the cover layer of the optical disc is detected;

FIG. 6B is a schematic diagram illustrating associated signals during the thickness of a multi-layer optical disc is detected;

DETAILED DESCRIPTION

Figure 1:
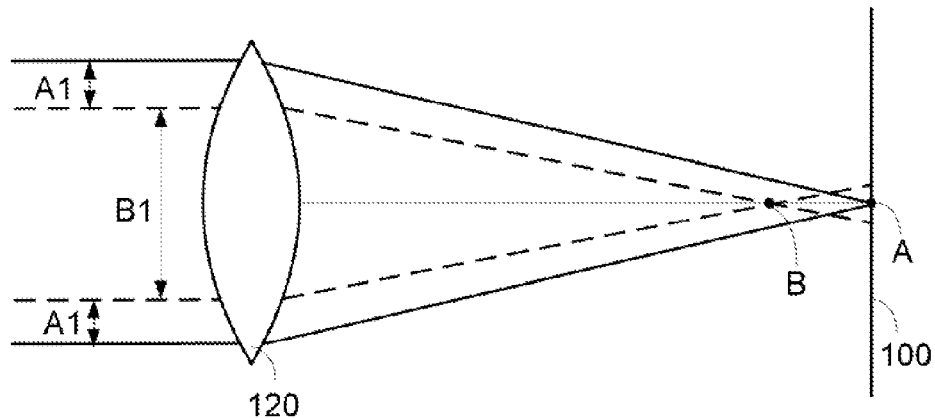
FIG. 1 is a schematic diagram illustrating a spherical aberration effect observed in a lens.
Figure 2A:
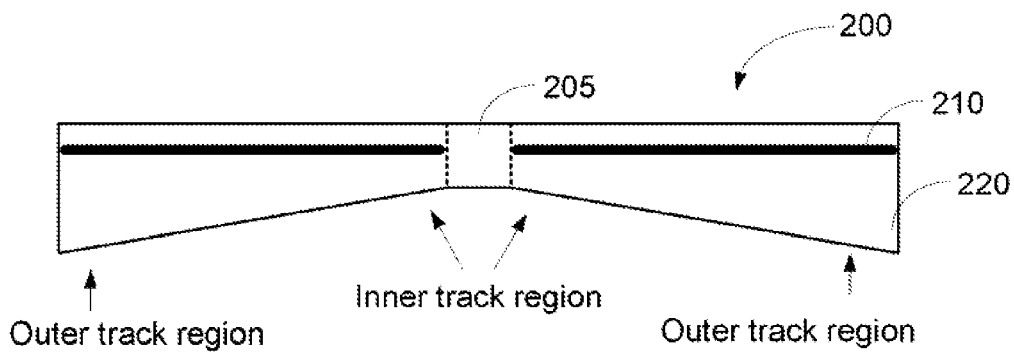
FIGS. 2A and 2B are schematic diagrams illustrating two kinds of optical discs with non-uniform cover layer thickness.
Figure 2B:
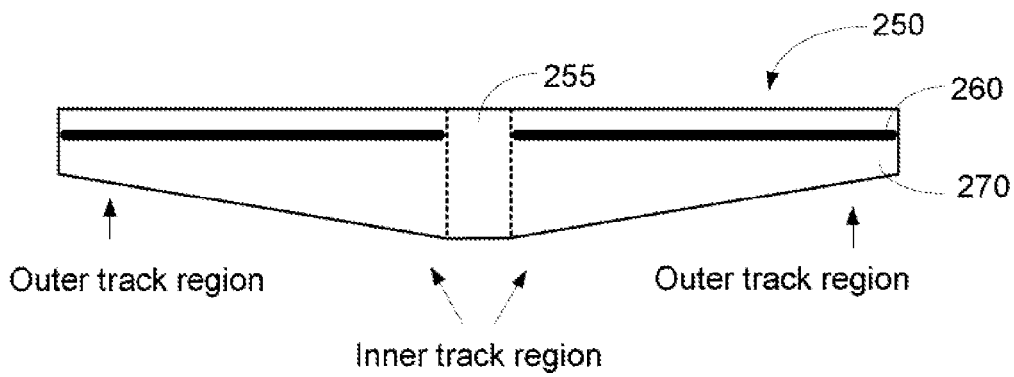
Figure 3:
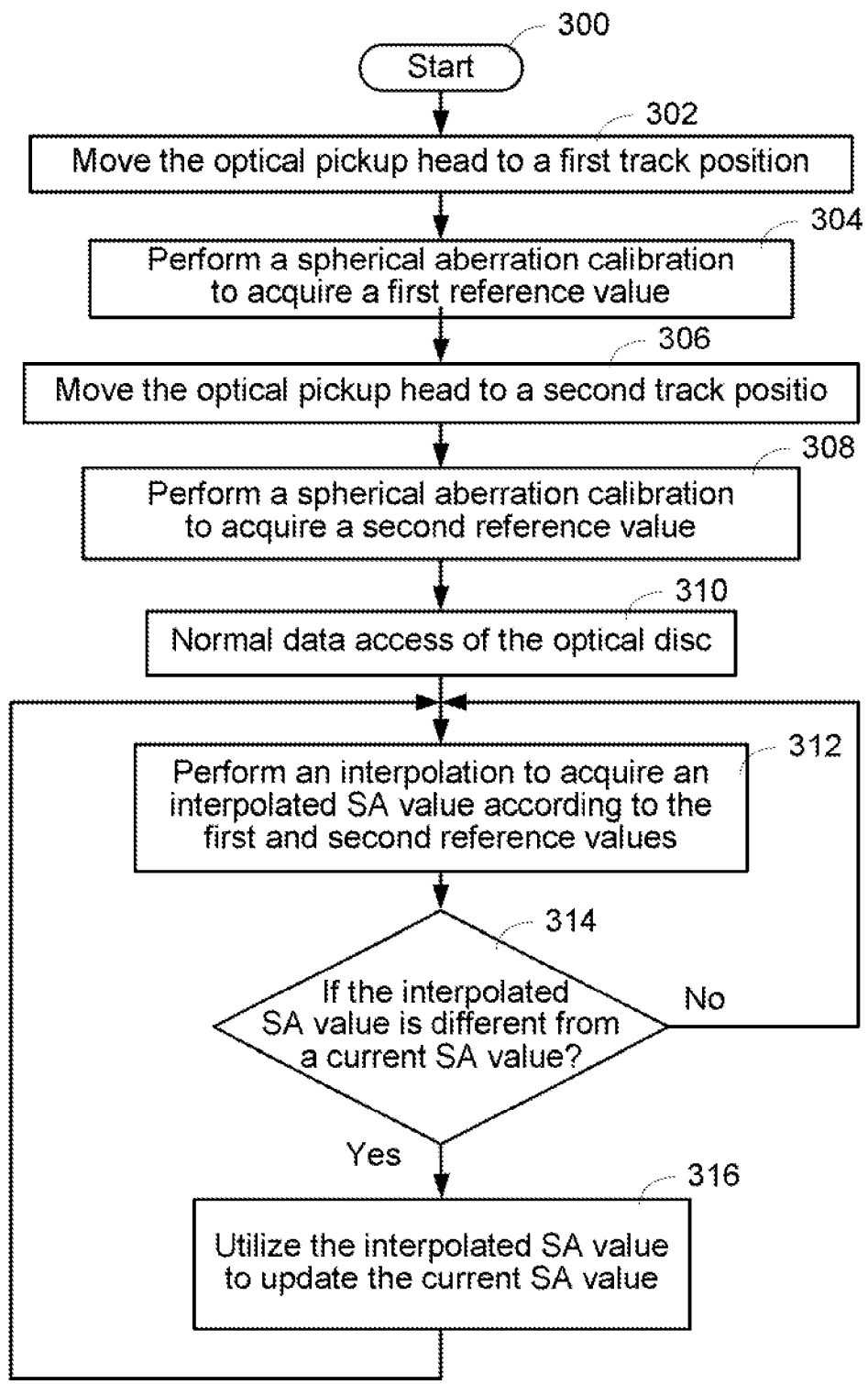
FIG. 3 is a flowchart illustrating a conventional spherical aberration compensation method.

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

FIGS. 4A and 4B are schematic diagrams illustrating the operations of a collimating-type spherical aberration compensator in response to a thickness change of a cover layer of an optical disc according to the present invention.

As shown in FIG. 4A, the collimating-type spherical aberration compensator 420 is used for receiving a spherical aberration compensation value. According to the spherical aberration compensation value, the distance between a first optical element (e.g. a first collimating lens) 422 and a second optical element (e.g. a second collimating lens) 424 is adjusted to reduce the spherical aberration. As such, the laser beams passing through the spherical aberration compensator 420 are focused on a data layer 402 of an optical disc 400 by a lens 410.

As shown in FIG. 4B, the cover layer 404 of the optical disc 400 is changed by a thickness change amount Δd with respect to that of FIG. 4A. For reducing the spherical aberration, the distance between the first optical element 422 and the second optical element 424 is changed by a distance change amount Δc, so that the laser beams passing through the spherical aberration compensator 420 are focused on a data layer 402 of an optical disc 400 by the lens 410. That is, if the cover layer 404 of the optical disc 400 is changed by a thickness change amount Δd, the compensation amount of the spherical aberration compensator 420 is Δc. The relation between Δc and Δd may be expressed by the following formula:

$$\Delta c = K \times \Delta d, \text{ or } \Delta c = -K \times \Delta d \tag{I}$$

wherein, the positive and negative signs indicate the moving directions of the first optical element 422, and they are determined according to the direction of changing the thickness change amount Δd.

The operating principle of the above formula will be illustrated in more details as follows. For example, the cover layer 404 of the optical disc 400 has a refractive index N. When the laser beams enters the cover layer 404, a refractive angle θ is defined between the laser beam and the normal of the cover layer 404. According to theories of geometric optics, the optical path difference between the paraxial zone and the axial zone of the lens 410 is analyzed. In response to the thickness change amount Δd of the cover layer 404 of the optical disc 400, the optical path difference "e" between the laser beams passing through the paraxial zone and the axial zone of the lens 410 to the focus. The optical path difference "e" is a main cause of the spherical aberration, and may be expressed by the following formula:

$$e = N \times \left( \frac{\Delta d}{\cos \theta} - \Delta d \right) = \frac{N}{\cos \theta} \times (1 - \cos \theta) \times \Delta d \tag{II}$$

From the formula (II), it is found that the refractive index N and the refractive angle θ are dependent on the material of the cover layer 404. The term [N/cos θ×(1−cos θ)] may be considered as a constant K, which is also referred as a compensation constant. In other words, the optical path difference "e" is in direct proportion to the thickness change amount Δd of the cover layer 404. From the formula (I), it is found that the spherical aberration compensator 420 is design to compensate the spherical aberration K×Δd resulting from the optical path difference "e". If the optical path difference Δc generated by the spherical aberration compensator 420 is equal to K×Δd, the optical path difference resulting from the thickness change of the cover layer 420 will be corrected and thus the spherical aberration is corrected. That is, from the formulae (I) and (II), if the thickness change amount Δd of the cover layer 404 is known and the compensation constant K is provided by the manufacturer of the optical pickup head or acquired from undue experiments, the final spherical aberration compensation value Δc will be realized. Similarly, if a LCD-type spherical aberration compensator is used for receiving the receiving a spherical aberration compensation value, the relation between the thickness change amount Δd of the cover layer of the optical disc and the distance change amount Δc is similar to that of the collimating-type spherical aberration compensator, and is not redundantly described herein.

Figure 5A:
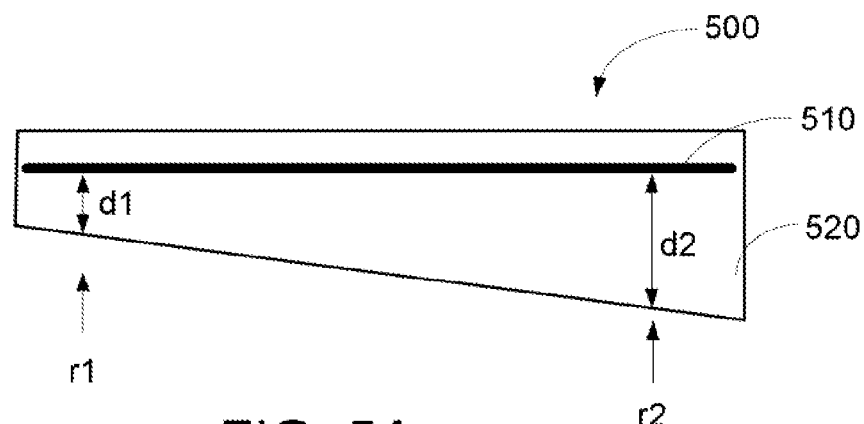
FIG. 5A is a schematic diagram illustrating an optical disc having a cover layer with non-uniform thickness.
Figure 5B:
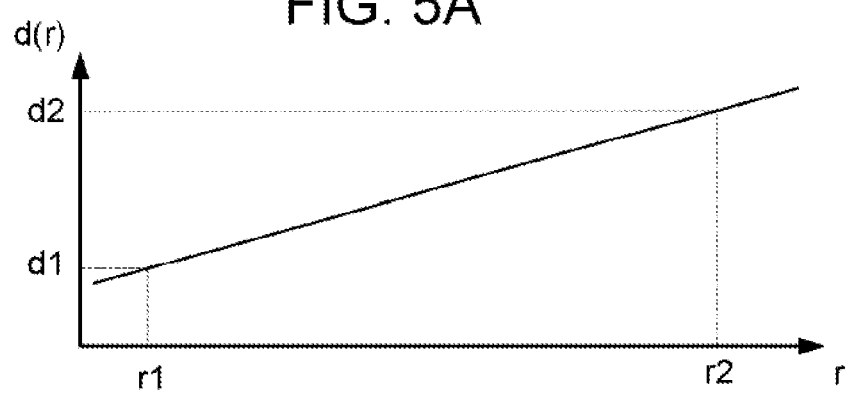
FIG. 5B is a plot illustrating the thickness of the cover layer at different radius positions.
Figure 5C:
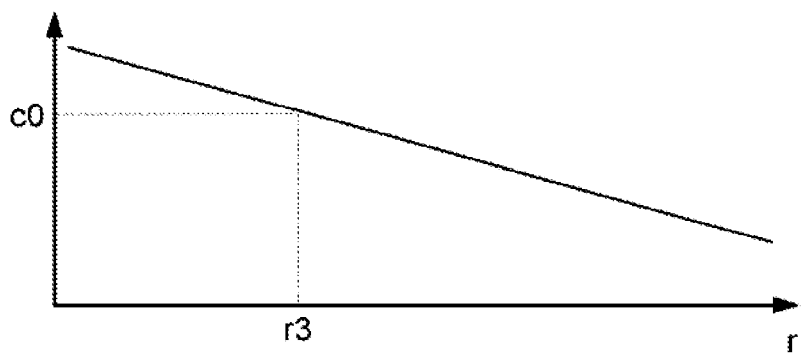
FIG. 5C is a plot illustrating the spherical aberration compensation value at different radius positions.

FIG. 5A is a schematic diagram illustrating an optical disc having a cover layer with non-uniform thickness. FIG. 5B is a plot illustrating the thickness of the cover layer at different radius positions. FIG. 5C is a plot illustrating the spherical aberration compensation value at different radius positions. Please refer to FIGS. 5A, 5B and 5C. As shown in FIG. 5A, when the optical pickup head (not shown) is moved to a first radius position r1, a first thickness d1 of the cover layer 520 is acquired; when the optical pickup head is moved to a second radius position r2, a second thickness d2 of the cover layer 520 is acquired. The first thickness d1 or d2 indicates the distance between the surface of the optical disc 500 and the data layer 510. After the first thickness d1 of the cover layer 520 at the first radius position r1 and the second thickness d2 of the cover layer 520 at the second radius position r2 are acquired, a linear relationship d(r) between the thickness and the radius position of the cover layer 520 of the optical disc 500 is obtained. According to the linear relationship d(r) between the thickness of the cover layer 520 and the radius of the optical disc 500, the thickness of the cover layer 520 at any radius position of the optical disc 500 is realized.

From the formula (II), it is found that the spherical aberration compensation value (also referred as SA value) and the thickness of the cover 520 are in a linear relationship. Due to a linear mapping, it is deduced that the radius of the optical disc 500 and the spherical aberration compensation value are also in a linear relationship. Then, the optical pickup head is moved to any radius position (e.g. a third radius position r3), and a spherical aberration calibration is performed at the third radius position r3 to obtain an optimal SA value c0. Then, according to the third radius position r3 and the optimal SA value c0, the SA value at any radius position may be calculated by the formulae: $c=c0+\Delta c$, and $\Delta c=K\times\Delta d$. After the SA value is obtained, the SA value is inputted to the spherical aberration compensator to control operations of the optical pickup head, so that the influence of the spherical aberration will be decreased. It is of course that the third radius position r3 may be identical to the first radius position r1 or the second radius position r2. In this embodiment, the first radius position r1 is an inner track position of the optical disc, and the second radius position r2 is an outer track position of the optical disc.

From the above description, the spherical aberration compensation method of the present invention is capable of acquiring the SA value by performing a single spherical aberration calibration at a specified radius position of the optical disc. Then, according to the thickness deviation of the cover layer of the optical disc, the SA value at any radius position can be easily calculated. Since the cover layer thickness is calculated without difficulty and the computing time is very short, the start-up procedure may be performed in a short time period.

Hereinafter, some approaches of detecting the thickness of the cover layer of the optical disc are introduced. Generally, the controlling unit of the optical disc drive comprises a motor driver for outputting a focus motor output signal FMO. According to the focus motor output signal FMO, a lens of the optical pickup head is moved. During the lens is moved, the laser beam reflected by the optical disc is sent to a photo sensor. According to the intensity change of the laser beam, plural photo signals are generated. The photo signals are processed into a beam intensity signal BS and a focusing error signal FE.

Generally, the focus motor output signal FMO outputted from the motor driver is gradually increased. According to the focus motor output signal FMO, the lens is controlled to move toward the optical disc. In addition, the speed (v) of moving the lens may be obtained according to the slope of the focus motor output signal FMO. FIG. 6A is a schematic diagram illustrating associated signals during the thickness of the cover layer of the optical disc is detected. As the lens is ascended, the focus point of the laser beam successively crosses the surface of the optical disc. In this situation, the beam intensity signal BS has a first peak value with lower amplitude. As the lens is continuously ascended and the focus point reaches the data layer, the beam intensity signal BS has a second peak value with higher amplitude. Then, the time interval T between these two peak values is measured. The thickness of the cover layer of the optical disc may be calculated by the formula: $d=v\times T$.

Alternatively, as the lens is ascended, the focus point of the laser beam successively crosses the surface of the optical disc. In this situation, a first S curve of the focusing error signal FE having a lower peak-to-peak value is obtained. As the lens is continuously ascended and the focus point reaches the data layer, a second S curve of the focusing error signal FE having a higher peak-to-peak value is obtained. Then, the time interval T between the zero crossing points of the first S curve and the second S curve is also measured. Similarly, the thickness of the cover layer of the optical disc may be calculated according to the formula: $d=v\times T$.

The above approaches may also be applied to measuring the distance between any two layers of a multi-layer optical disc. FIG. 6B is a schematic diagram illustrating associated signals during the thickness of a multi-layer optical disc is detected. For example, the multi-layer optical disc is a four-layer optical disc. As the lens is ascended, the focus point of the laser beam successively crosses a surface, a first data layer, a second data layer, a third data layer and a fourth data layer of the optical disc. As such, the time interval Tc for the focus point of the laser beam to move from the surface to the first data layer, the time interval Td1 for the focus point of the laser beam to move from the first data layer to the second data layer, the time interval Td2 for the focus point of the laser beam to move from the second data layer to the third data layer and the time interval Td3 for the focus point of the laser beam to move from the third data layer to the fourth data layer are acquired. The multi-layer optical disc of this embodiment is illustrated by referring to a four-layer optical disc. Nevertheless, the multi-layer optical disc may have three or more than four data layers, and the time interval for the focus point of the laser beam to move between any two data layers may be acquired in the same way.

Accordingly, the distance between the surface and any data layer of the optical disc may be calculated. For example, after the speed (v) of moving the lens is obtained according to the slope of the focus motor output signal FMO, the distance between the third data layer and the surface of the optical disc is calculated by the formula: $d'=v\times(Tc+Td1+Td2)$.

Figure 7:
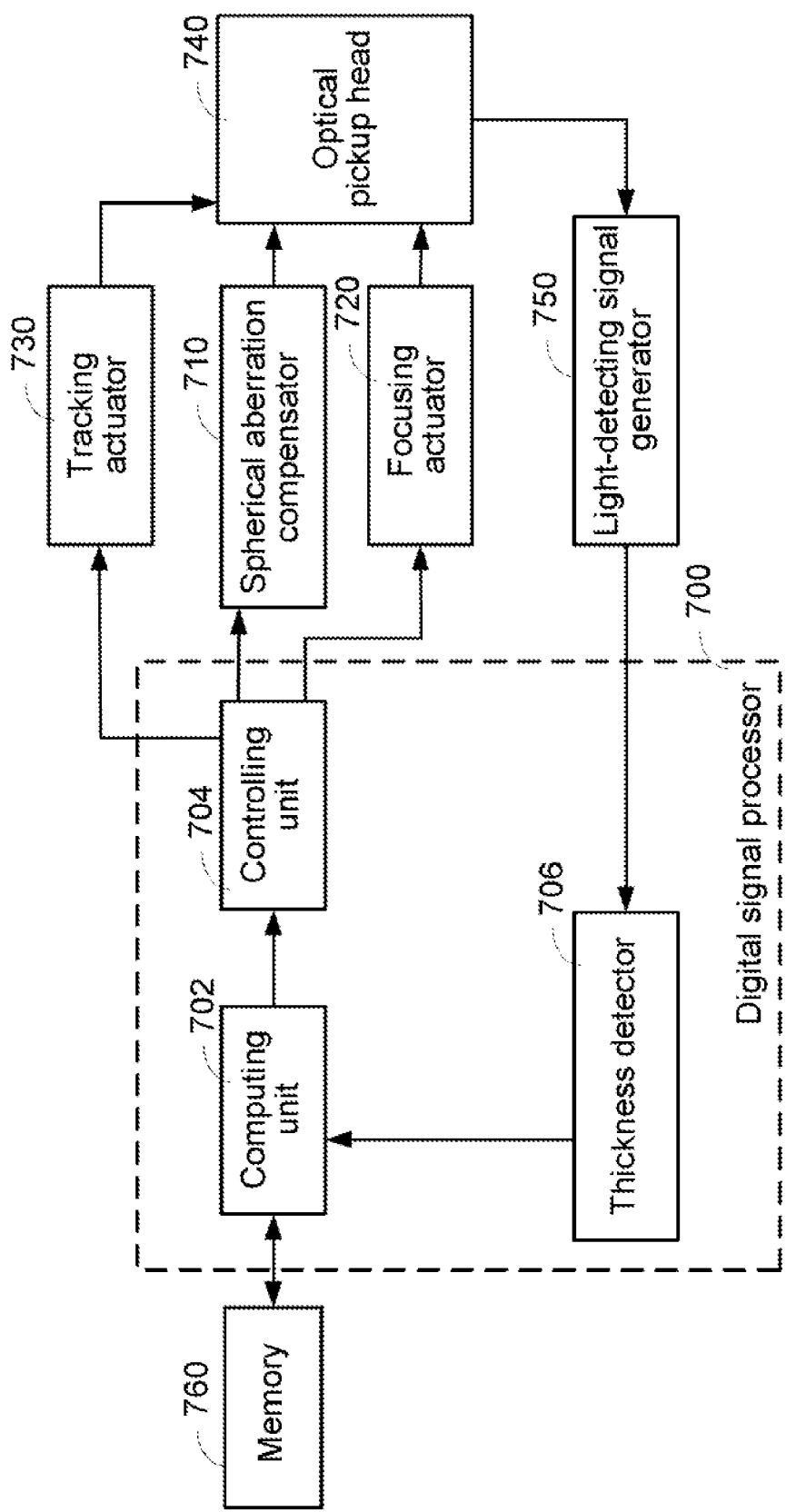
FIG. 7 is a schematic functional block diagram illustrating a spherical aberration compensation device of an optical disc drive.

FIG. 7 is a schematic functional block diagram illustrating a spherical aberration compensation device of an optical disc drive according to an embodiment of the present invention. As shown in FIG. 7, the spherical aberration compensation device comprises a digital signal processor (DSP) 700, a spherical aberration compensator 710, a focusing actuator 720, a tracking actuator 730, an optical pickup head 740, a light-detecting signal generator 750 and a memory 760. Moreover, the digital signal processor 700 comprises a computing unit 702, a controlling unit 704 and a thickness detector 706.

Please refer to FIGS. 5, 6 and 7. During the start-up procedure of the optical disc drive, the tracking actuator 730 is controlled by the controlling unit 704 to move the optical pickup head 740 in a tracking (radial) direction to the first radius position r1. At the same time, a focus motor output signal FMO is issued from the controlling unit 704 to the focusing actuator 720 to control movement of a lens within the optical pickup head 740. During the lens is moved, the laser beam is reflected by the optical disc. According to the intensity change of the laser beam, plural photo signals are generated. The photo signals are received by the light-detecting signal generator 750 and processed into various electric signals such as a focusing error signal FE, a beam intensity signal BS and a tracking error signal TE. According to the electric signals, the first thickness d1 of the cover layer at the first radius position r1 is obtained by the thickness detector 706.

Then, the tracking actuator 730 is controlled by the controlling unit 704 to move the optical pickup head 740 in the tracking (radial) direction to the second radius position r2. At the same time, a focus motor output signal FMO is issued from the controlling unit 704 to the focusing actuator 720 to control movement of the lens within the optical pickup head 740. During the lens is moved, the laser beam is reflected by the optical disc. According to the intensity change of the laser beam, plural photo signals are generated. The photo signals are received by the light-detecting signal generator 750 and processed into various light-detecting signals such as a focusing error signal FE, a beam intensity signal BS and a tracking error signal TE. According to the light-detecting signals, the second thickness d2 of the cover layer at the second radius position r2 is obtained by the thickness detector 706. In this embodiment, the first radius position r1 is an inner track position of the optical disc, and the second radius position r2 is an outer track position of the optical disc.

According to the first thickness d1 of the cover layer at the first radius position r1 and the second thickness d2 of the cover layer at the second radius position r2, the computing unit 702 will acquire the relation between the thickness of the cover layer and the radius of the optical disc. Then, the controlling unit 704 performs a spherical aberration calibration at the third radius position r3 to obtain an optimal SA value c0. According to the optimal SA value c0 corresponding to the third radius position r3, the computing unit 702 will acquire the relation between the radius position and the SA value.

As such, during normal operation of the optical pickup drive, the SA value corresponding to any radius position of the optical pickup head 740 will be acquired by the computing unit 702, and transmitted to the spherical aberration compensator 710. As such, the influence of the spherical aberration will be decreased.

Moreover, some approaches for performing the spherical aberration calibration will be illustrated as follows. For example, in accordance with a first approach, before a tracking-on operation is done, the calibration is performed according to some servo signals (e.g. a focusing error signal FE or a tracking error signal TE) in order to obtain the optimal SA value c0. In accordance with a second approach, after a tracking-on operation is done, the calibration is performed according to an error rate of reading data on the track of the optical disc in order to obtain the optimal SA value c0. In accordance with a third approach, the optimal SA value c0 corresponding to a standard thickness is suggested by the manufacturer of the spherical aberration compensator 710, and previously stored in the memory 760. During the spherical aberration calibration is performed, the optimal SA value c0 stored in the memory 760 is directly read. In accordance with a fourth approach, after the start-up procedure of the optical disc drive is performed and then the data of the optical disc are read, the spherical aberration calibration may be dynamically performed.

Any of the above-mentioned approaches for performing the spherical aberration calibration may be used to acquire the optimal SA value c0. After the optimal SA value c0, the further spherical aberration compensating operation will be performed.

Figure 8:
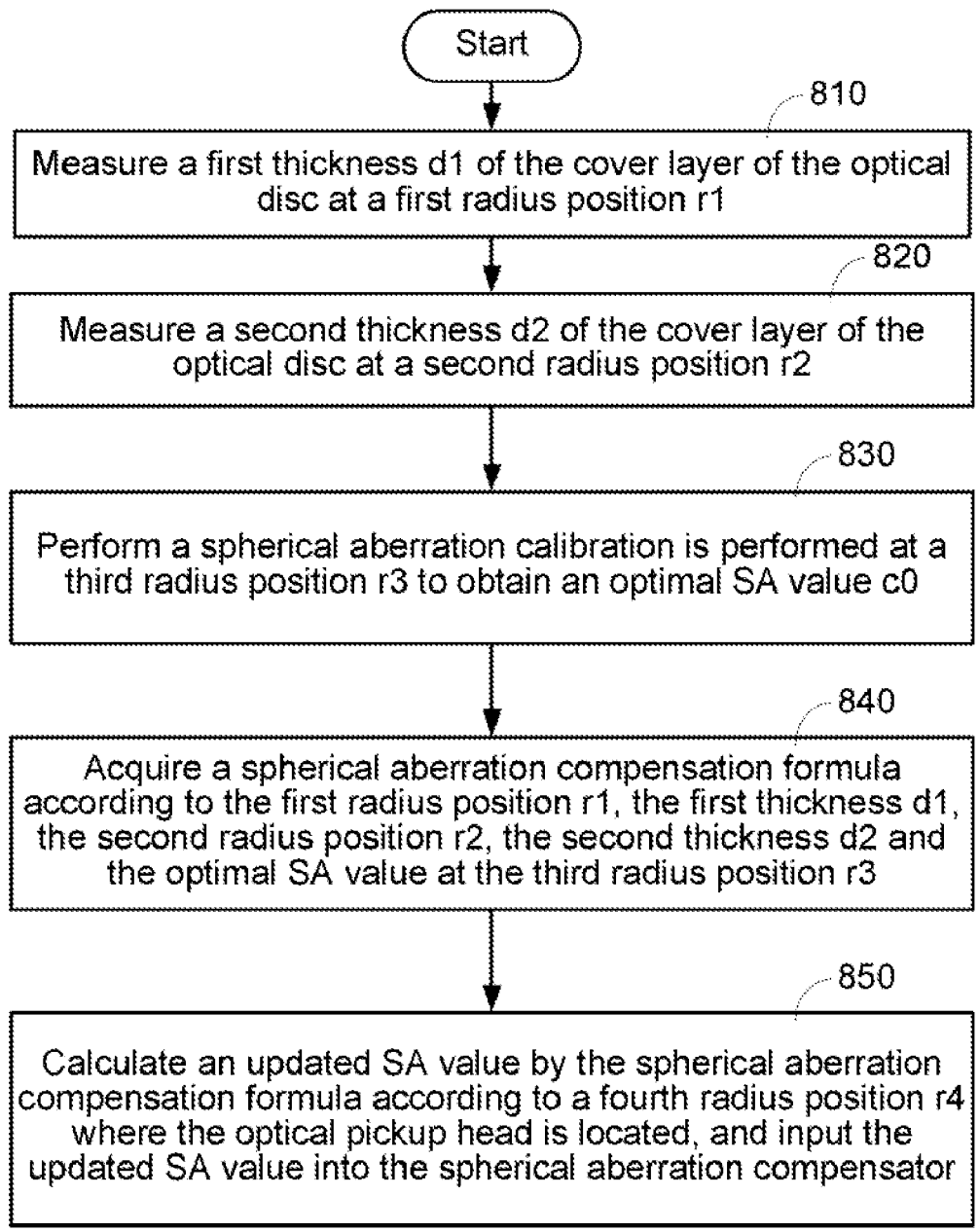
FIG. 8 is a flowchart illustrating a spherical aberration compensation method of an optical disc drive according to a first embodiment of the present invention.

FIG. 8 is a flowchart illustrating a spherical aberration compensation method of an optical disc drive according to a first embodiment of the present invention. During the start-up procedure of the optical disc drive, a first thickness d1 of the cover layer of the optical disc at a first radius position r1 is measured (Step 810), and then a second thickness d2 of the cover layer of the optical disc at a second radius position r2 is measured (Step 820). Then, a spherical aberration calibration is performed at a third radius position r3 to obtain an optimal SA value c0 (Step 830). According to the first radius position r1, the first thickness d1, the second radius position r2, the second thickness d2 and the an optimal SA value c0 at the third radius position r3, a spherical aberration compensation formula is acquired (Step 840). Afterwards, according to a fourth radius position r4 where the optical pickup head is located, an updated SA value is calculated by the spherical aberration compensation formula and the updated SA value is inputted into the spherical aberration compensator (Step 850).

In the first embodiment, the first radius position r1 is an inner track position of the optical disc, and the second radius position r2 is an outer track position of the optical disc. The third radius position r3 is not restricted. For example, the third radius position r3 may be identical to the first radius position r1 or the second radius position r2. The spherical aberration calibration in Step 830 may be performed by any of the above-mentioned approaches. Moreover, the spherical aberration compensation formula acquired in Step 840 is deduced as: $c=c0+K\times\Delta d$, wherein c0 is an optimal SA value at the third radius position r3, $\Delta d$ is a thickness change amount of the cover layer of the optical disc between the fourth radius position r4 and the third radius position r3, K is a compensation constant and c is the calculated SA value.

Figure 9:
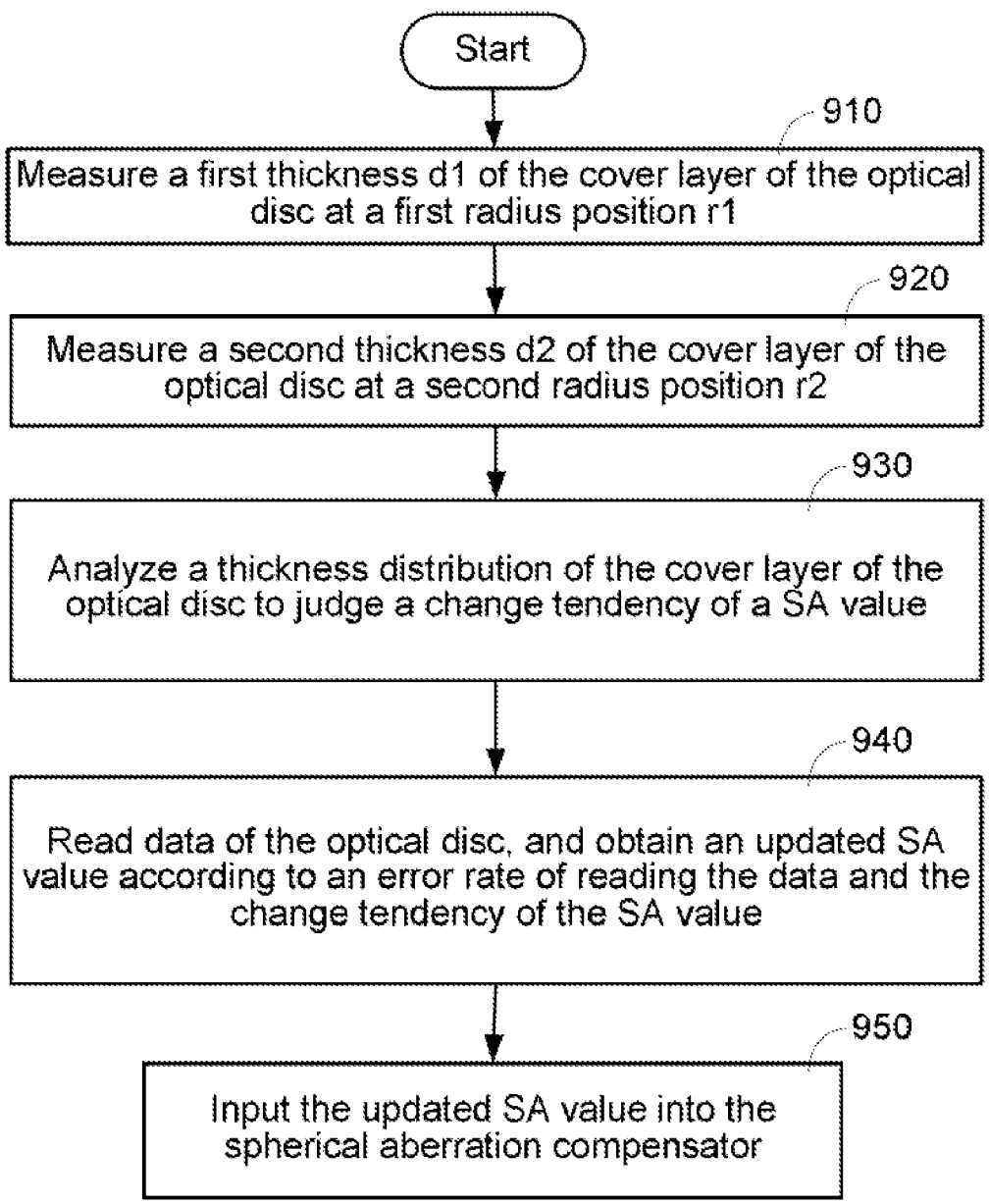
FIG. 9 is a flowchart illustrating a spherical aberration compensation method of an optical disc drive according to a second embodiment of the present invention.

FIG. 9 is a flowchart illustrating a spherical aberration compensation method of an optical disc drive according to a second embodiment of the present invention. During the start-up procedure of the optical disc drive, a first thickness d1 of the cover layer of the optical disc at a first radius position r1 is measured (Step 910), and then a second thickness d2 of the cover layer of the optical disc at a second radius position r2 is measured (Step 920). Then, a thickness distribution of the cover layer of the optical disc is analyzed to judge a change tendency of a SA value (Step 930). Then, the data of the optical disc are read. According to an error rate of reading the data and the change tendency of the SA value, an updated SA value is obtained by a trial-and-error process (Step 940). Afterward, the updated SA value is inputted into the spherical aberration compensator (Step 950).

In the second embodiment, the first radius position r1 is an inner track position of the optical disc, and the second radius position r2 is an outer track position of the optical disc. The third radius position r3 is not restricted. For example, the third radius position r3 may be identical to the first radius position r1 or the second radius position r2. The thickness distribution of the cover layer analyzed in Step 930 may be classified into three types: (a) gradual increase of the thickness from the inner track region to the outer track region, (b) gradual decrease of the thickness from the inner track region to the outer track region, and (c) slight thickness difference between the inner track region from the outer track region. After the thickness distribution is realized, the direction of compensating spherical aberration will be determined. In other words, when the data of the optical disc at any radius position are read by the optical disc drive, the spherical aberration compensation value will be dynamically adjusted according to the error rate of reading the data in order to correct the spherical aberration. Since the change tendency of the spherical aberration compensation value can be previously realized, the time period for compensating the spherical aberration by the trial-and-error process will be shortened.

Of course, the spherical aberration compensation method of the present invention may be applied to a multi-layer optical disc. After the relation between the thicknesses of any data layer of the multi-layer optical disc at different radius is acquired, a spherical aberration calibration is performed to acquire the spherical aberration compensation formula corresponding to any data layer. As a consequence, the spherical aberration resulting from the non-uniform thickness of the cover layer can be compensated.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A spherical aberration compensation method of an optical disc drive, the method comprising steps of:
    measuring a first thickness of a cover layer at a first radius position of an optical disc;
    measuring a second thickness of the cover layer at a second radius position of the optical disc;
    performing a spherical aberration calibration at a third radius position of the optical disc to obtain an optimal spherical aberration compensation value;
    acquiring a spherical aberration compensation formula according to the first radius position, the second radius position, the first thickness, the second thickness and the optimal spherical aberration compensation value at the third radius position; and
    calculating an updated spherical aberration compensation value by the spherical aberration compensation formula according to a fourth radius position where an optical pickup head of the optical disc drive is located, and inputting the updated spherical aberration compensation value into a spherical aberration compensator of the optical disc drive.

2. The method according to claim 1 wherein the spherical aberration compensation formula is expressed by: $c=c0+K\times \Delta d$, wherein $c0$ is the optimal spherical aberration compensation value at the third radius position, $\Delta d$ is a thickness change amount of the cover layer of the optical disc between the fourth radius position and the third radius position, $K$ is a compensation constant, and $c$ is the updated spherical aberration compensation value.

3. The method according to claim 1 wherein the spherical aberration calibration is performed according to plural servo signals outputted from the optical pickup head before a tracking-on operation of the optical disc drive is done, thereby obtaining the optimal spherical aberration compensation value.

4. The method according to claim 1 wherein the spherical aberration calibration is performed by a trial-and-error process according to an error rate of reading data from the optical disc after a tracking-on operation of the optical disc drive is done, thereby obtaining the optimal spherical aberration compensation value.

5. The method according to claim 1 wherein the spherical aberration calibration is performed according to the optimal spherical aberration compensation value corresponding to a standard thickness, thereby obtaining the updated spherical aberration compensation value.

6. A spherical aberration compensation method of an optical disc drive, the spherical aberration compensation method comprising steps of:
    measuring a first thickness of a cover layer at a first radius position of an optical disc;
    measuring a second thickness of the cover layer at a second radius position of the optical disc;
    analyzing a thickness distribution of the cover layer of the optical disc according to the first radius position, the second radius position, the first thickness and the second thickness, thereby judging a change tendency of a spherical aberration compensation value;
    reading data of the optical disc, and acquiring an updated spherical aberration compensation value according to an error rate of reading the data and the change tendency of the spherical aberration compensation value; and
    inputting the updated spherical aberration compensation value into a spherical aberration compensator of the optical disc drive.

7. A spherical aberration compensation device of an optical disc drive, the spherical aberration compensation device being connected with an optical pickup head, and comprising:
    a tracking actuator connected with the optical pickup head for controlling the optical pickup head to move in a radial direction;
    a spherical aberration compensator;
    a focusing actuator connected with the optical pickup head for controlling the optical pickup head to move in a focusing direction;
    a light-detecting signal generator for receiving photo signals generated from the optical pickup head, and processing the photo signals into various electric signals; and
    a digital signal processor electrically connected with the tracking actuator, the spherical aberration compensator, the focusing actuator and the light-detecting signal generator, wherein under control of the digital signal processor, a first thickness of a cover layer of an optical disc is measured by moving the optical pickup head to a first radius position of the optical disc, a second thickness of the cover layer is measured by moving the optical pickup head to a second radius position of the optical disc, a spherical aberration calibration is performed at a third radius position of the optical disc to obtain an optimal spherical aberration compensation value, a spherical aberration compensation formula is acquired according to the first, second and third radius positions and the first and second thicknesses and the optimal spherical aberration compensation value, an updated spherical aberration compensation value is calculated by the spherical aberration compensation formula according to a fourth radius position where an optical pickup head of the optical disc drive is located, and the updated spherical aberration compensation value is inputted into the spherical aberration compensator.

8. The device according to claim 7 wherein the spherical aberration compensator comprises an LCD-type spherical aberration compensator or a collimating-type spherical aberration compensator.

9. The device according to claim 7 wherein the digital signal processor comprises:
    a thickness detector electrically connected with the light-detecting signal generator for measuring the first thickness and the second thickness of the cover layer according to the electric signals;

a computing unit electrically connected with the thickness detector for receiving the first thickness of the cover layer at the first radius position and the second thickness of the cover layer at the second radius position, and acquiring a relation between the updated spherical aberration compensation value and the radius of the optical disc according to the first thickness, the second thickness and the optimal spherical aberration compensation value corresponding to the third radius position; and a controlling unit electrically connected with the spherical aberration compensator, wherein when the optical pickup head of the optical disc drive is located at the fourth radius position, the controlling unit is controlled by the computing unit to input the updated spherical aberration compensation value into the spherical aberration compensator.

10. The device according to claim 9 further comprising a memory electrically connected with the computing unit for storing the optimal spherical aberration compensation value, so that the optimal spherical aberration compensation value is directly read during the spherical aberration calibration is performed.

* * * * *